United States Patent
Berger et al.

(10) Patent No.: US 11,299,143 B2
(45) Date of Patent: Apr. 12, 2022

(54) OPERATING METHOD FOR A HYBRID VEHICLE

(71) Applicant: Bayerische Motoren Werke Aktiengesellschaft, Munich (DE)

(72) Inventors: Eric Berger, Freising (DE); Arthur Huelsmann, Munich (DE); Daniel Mau, Munich (DE); Ferdinand Wiesbeck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 192 days.

(21) Appl. No.: 16/412,309

(22) Filed: May 14, 2019

(65) Prior Publication Data
US 2019/0263390 A1    Aug. 29, 2019

Related U.S. Application Data

(63) Continuation of application No. PCT/EP2017/078384, filed on Nov. 7, 2017.

(30) Foreign Application Priority Data

Nov. 16, 2016  (DE) .................... 10 2016 222 448.4

(51) Int. Cl.
*B60W 20/40*    (2016.01)

(52) U.S. Cl.
CPC ....... *B60W 20/40* (2013.01); *B60W 2510/244* (2013.01); *B60W 2510/246* (2013.01); *B60W 2552/15* (2020.02); *B60W 2555/20* (2020.02)

(58) Field of Classification Search
CPC ...... B60W 20/20; B60W 20/13; B60W 20/40; B60W 20/10; B60W 20/00
See application file for complete search history.

(56) References Cited

U.S. PATENT DOCUMENTS 9,340,202 B2    5/2016   Books et al.
9,421,967 B2 *  8/2016   Ueno ................... B60W 20/10
(Continued)

FOREIGN PATENT DOCUMENTS

AT       506 272 A2    7/2009
AT       507 916 A2    9/2010
(Continued)

OTHER PUBLICATIONS

PCT/EP2017/078384, International Search Report dated Mar. 2, 2018 (Four (4) pages).

(Continued)

*Primary Examiner* — Kelly D Williams
(74) *Attorney, Agent, or Firm* — Crowell & Moring LLP

(57) ABSTRACT

An operating method for a power train of a hybrid vehicle having an internal combustion engine, an electric drive machine and a rechargeable electric energy storage unit configured to supply the electric drive machine with energy, includes controlling the power train in a zero emission mode in which the internal combustion engine is deactivated and in which the electric drive machine serves to drive the hybrid vehicle, and in an emission mode in which the internal combustion engine is operated in a fired operation. The method also includes determining, for a system initiated change of operating mode from the zero emission mode into the emission mode, a starting command for the internal combustion engine. The change of operating mode from the zero emission mode into the emission mode is blocked for one of a predefinable delay time, a predefinable quantity of energy extracted from the electric energy storage unit, or a predefinable travel distance.

10 Claims, 1 Drawing Sheet

(56) References Cited

U.S. PATENT DOCUMENTS

| | | |
|---|---|---|
| 2007/0255477 A1 | 11/2007 | Okuda et al. |
| 2012/0029735 A1 | 2/2012 | Bakker |
| 2012/0253576 A1 | 10/2012 | Tamagawa |
| 2015/0370251 A1 | 12/2015 | Siegel et al. |
| 2016/0016663 A1 | 1/2016 | Stanek et al. |
| 2016/0176310 A1* | 6/2016 | Sato ................. B60L 53/00 180/65.25 |
| 2016/0280204 A1 | 9/2016 | Lian et al. |
| 2016/0280212 A1 | 9/2016 | Lian et al. |
| 2016/0304086 A1* | 10/2016 | Mansour ............ B60K 6/48 |
| 2018/0319389 A1* | 11/2018 | Felsch ............... B60W 10/06 |

FOREIGN PATENT DOCUMENTS

| | | |
|---|---|---|
| CN | 103914076 A | 7/2014 |
| CN | 104699102 A | 6/2015 |
| CN | 105398571 A | 3/2016 |
| CN | 105517664 A | 4/2016 |
| DE | 10 2012 001 740 A1 | 8/2013 |
| DE | 10 2013 103 849 A1 | 10/2014 |
| DE | 10 2016 106 466 A1 | 10/2016 |
| EP | 2 083 156 A1 | 7/2009 |
| WO | WO 2012/097349 A2 | 7/2012 |
| WO | WO 2016/038822 A1 | 3/2016 |

OTHER PUBLICATIONS

German Office Action issued in German counterpart application No. 10 2016 222 448.4 dated Oct. 19, 2017 (Six (6) pages).

Chinese Office Action issued in Chinese application No. 201780054359.9 dated May 21, 2021, with partial English translation (Twenty Two (22) pages).

* cited by examiner

OPERATING METHOD FOR A HYBRID VEHICLE

CROSS REFERENCE TO RELATED APPLICATIONS

This application is a continuation of PCT International Application No. PCT/EP2017/078384, filed Nov. 7, 2017, which claims priority under 35 U.S.C. § 119 from German Patent Application No. 10 2016 222 448.4, filed Nov. 16, 2016, the entire disclosures of which are herein expressly incorporated by reference.

BACKGROUND AND SUMMARY OF THE INVENTION

The invention relates to a method for operating a hybrid vehicle according to the preamble of the first patent claim. Methods for operating hybrid vehicles in which parameters, such as the state of charge of the electric energy storage unit, influence the control of the drive are known from the prior art; DE 10 2013 103 849 A1 is concerned with such a method.

The invention is described below with reference to the power train of a hybrid vehicle, that is to say a power train which has both an internal combustion engine and an electric motor for making available drive power for overcoming driving resistances, and such a power train can be operated in different driving modes. Changeovers between different driving modes can be initiated by the vehicle control unit on the basis of the stored operating strategy, in particular even under otherwise constant driving conditions (system-initiated changeover of driving mode) or can be caused by transient driving states, in particular an acceleration process (driver-initiated changeover of driving mode).

A changeover of driving mode from a driving mode in which the electric drive machine is used exclusively to provide drive (zero-emission mode) into a driving mode in which the internal combustion engine is used exclusively or additionally to provide drive (emission mode), that is to say a driving mode in which the internal combustion engine is operated in a fired operation, is noticeable to vehicle occupants, since the internal combustion engine causes, inter alia, perceptible noises.

System-initiated changeovers of driving mode in which the internal combustion engine is started are frequently experienced by vehicle occupants as reducing comfort, since said vehicle occupants abruptly notice the abovementioned changes as a result of the starting of the internal combustion engine, and consequently a reduction in such system-initiated changeovers of driving mode gives rise to an improvement in comfort.

DE 10 2013 103 849 A1 is concerned with an operating method with different driving modes for a hybrid vehicle and with a hybrid vehicle which can be controlled by means of such a method.

An object of the invention is to specify an operating method with which the power train of a hybrid vehicle can be controlled with a high level of comfort as well as to also specify a control unit with this operating method.

The proposed operating method is a method for controlling a power train for a hybrid vehicle. Such a power train has, in particular, an internal combustion engine, preferably of a reciprocating piston design, preferably a four-stroke spark-ignition engine or diesel engine. Also preferably, such a power train has an electric drive machine, preferably an electric motor/electric generator. Also preferably, a rechargeable electric energy storage unit is provided for supplying the electric drive machine with electrical energy. The electric energy storage unit is preferably configured as a lithium-ion energy storage unit, preferably as what is referred to as a high-voltage accumulator or traction accumulator.

In the proposed operating method, at least two operating modes are provided, one of which does not directly cause any emissions, and can be considered to be what is referred to as a zero-emission mode, and the other is an operating mode in which the internal combustion engine is operated in a fired operation and, owing to this system, emissions are caused, what is referred to as an emission mode.

In this sense, a fired operation of the internal combustion engine is to be understood as an operating mode thereof in which fuel is burned in the internal combustion engine, with the result that drive power can be output by said internal combustion engine, preferably by a crankshaft in the form of rotational speed and a torque. In the zero-emission mode, fuel is not burned in the internal combustion engine, the internal combustion engine is therefore, in particular, deactivated and, in particular, no drive power can be output by the crankshaft in this operating mode. The internal combustion engine is preferably in the stationary state in the zero-emission mode, preferably the crankshaft is stationary, and for example does not carry out any rotational movement. Drive power in the zero-emission mode can preferably be made available exclusively by the electric drive machine.

A starting command is determined by the operating method for a system-initiated changeover of operating mode from the zero-emission mode into the emission mode. This system-initiated starting command is preferably determined under constant driving conditions. The term under constant driving conditions is preferably to be understood as meaning travel with an invariable gradient, preferably with an invariable acceleration and particularly preferably at a constant speed and also preferably at a constant temperature. This temperature is preferably to be understood as relating to the energy storage unit, in particular relating to a region of the energy storage unit or preferably relating to the surroundings (ambient temperature). Such actually occurring variables are preferably generally to be understood as actual internal combustion engine starting parameters.

An internal combustion engine starting threshold value is to be understood as being a predefinable threshold value for a state of charge of the electric energy storage unit or preferably for a roadway gradient traveled along or preferably for a temperature, preferably a temperature of the electric energy storage unit or preferably of the surroundings. This threshold value is preferably dependent on a vehicle speed or on a load request, in particular that is to say a torque request, to the power train. The starting command is preferably determined when the respective actual internal combustion engine starting parameter has reached or undershot the respective internal combustion engine starting threshold value.

The internal combustion engine starting threshold value is explained, in particular, using the example of constant travel on the flat, a predefinable state of charge of the electric energy storage unit, and this energy storage unit is discharged on the flat when the motor vehicle is moving in the zero-emission mode. If the actual state of charge (actual internal combustion engine starting parameter) then reaches this threshold value, the operating method determines a system-initiated starting command for the internal combustion engine. In this context, the term system-initiated starting command is to be understood as meaning, in particular, a control command which can bring about starting of the internal combustion engine and is determined without an operator control input by the driver. These considerations can be correspondingly transferred to the other actual internal combustion engine starting parameters.

In particular, in order to make the operation of the power train more comfortable, the number of system-initiated changeovers of operating mode from the zero-emission mode into the emission mode is reduced by the method according to the invention. For this reduction, the starting command, preferably the system-initiated starting command or the execution thereof is blocked by the operating method according to the invention, preferably for a predefinable delay time or preferably for a predefinable quantity of energy which can be extracted from the electric energy storage unit, or also preferably for a predefinable travel distance of the motor vehicle.

Expressed in figurative terms, in the case of an operating method which is known from the prior art in a power train which is operated in the zero-emission mode, at a specific speed, for example 50 Km/h and in the case of a specific load request, for example 20% of the maximum drive torque, a control command is output when an actual state of charge of 30% of the electric energy storage unit is reached, which control command causes the internal combustion engine to start, that is to say brings about a changeover from the zero-emission mode into the emission mode. This system-initiated changeover of operating mode would be executed under constant driving conditions, i.e. the speed is constant and the vehicle is moving on the flat. For the vehicle occupants, this changeover of operating mode would therefore take place unexpectedly and give rise to a reduction in comfort. If the speed were to be reduced to a certain degree briefly after the changeover of operating mode, the changeover of operating mode would take place unnecessarily, and the proposed operating method attempts to make use of these transient driving states.

The proposed operating method provides blocking of the, in particular system-initiated, changeover of operating mode from the zero-emission mode into the emission mode. This blocking is preferably possible by means of a delay time of preferably less than 300 seconds, preferably less than 120 seconds and particularly preferably less than 60 seconds or preferably by means of a predefinable stored quantity of energy (charging capacity) or also preferably by means of a predefinable travel distance, preferably less than 2 kilometers, preferably less than 750 meters and particularly preferably less than 350 meters.

In this context, the, in particular system-initiated, changeover of operating mode is blocked until the delay time has expired or the predefinable quantity of energy is extracted from the electric energy storage unit or the predefinable travel distance has been traveled. If, in particular after this blocking, the criteria for a system-initiated changeover of operating mode from the zero-emission mode into the emission mode continue to be satisfied, this changeover is executed; if the criteria are no longer satisfied, the changeover of operating mode is preferably not executed. The system-initiated changeover of operating mode is then, in particular, no longer blocked if a driver-initiated changeover of operating mode occurs in the phase of the blocking, in particular if the driver causes or requests, by means of the accelerator pedal position, a corresponding acceleration of the vehicle, or generally if this changeover of operating mode is caused by an operator control action of the driver (driver-initiated changeover of operating mode).

Expressed in different terms, if in the proposed operating method, in the case of the abovementioned data a system-initiated starting command is determined, said command is blocked for the predefinable delay time (or travel distance or quantity of energy), i.e. no system-initiated changeover of operating mode from the zero-emission mode into the emission mode takes place, and during this blocking, for example, a reduction in the speed occurs, and therefore there is no longer a need for a changeover of operating mode, the determined starting command is not executed. If, in a different case, in particular during the blocking of the starting command, a driver-initiated changeover of operating mode occurs, preferably by means of an acceleration initiated by the driver, a section of route with a gradient or the like is traveled along, the system-initiated starting command is then no longer executed but rather the driver-initiated starting command. Since such a driver-initiated changeover of operating mode can be expected, at least by the driver, this does not give rise to a decrease in comfort, or gives rise only to a small decrease in comfort. In particular by means of such a control of the power train a reduction in the system-initiated changeover of operating mode can be achieved and as a result an improvement in comfort is made possible.

In one preferred embodiment of the operating method, the initiation of the changeover of operating mode, in particular from the zero-emission mode into the emission mode, that is to say an electric travel characteristic curve, can be predefined. Preferably a specific point of this electric travel characteristic curve can be predefined for a pair of the speed and the load request to the power train. An electric travel characteristic curve can be predefined preferably in the way described above, for a specific state of charge of the electric energy storage unit, preferably for a specific temperature of the electric energy storage unit or preferably for an ambient temperature, preferably for a specific roadway gradient or the like.

This electric travel characteristic curve preferably depends at least in certain sections on the vehicle speed and the load request to the power train. In particular, better controllability of the power train, in particular a reduction in the system-initiated changeovers of the operating mode can be achieved by means of what is referred to as the electric travel characteristic curve, that is to say a multiplicity of different internal combustion engine starting threshold values.

In one preferred embodiment of the operating method, at least two different discrete electric travel characteristic curves are applied for controlling the power train. Preferably, in each case one of these electric travel characteristic curves covers a specific range of the respective internal combustion engine starting parameter, preferably of the discharge range of the electric energy storage unit, preferably the discharge range of the electric energy storage unit can be predefined for which of the respective electric travel characteristic curves is used. In this context, the number of electric travel characteristic curves and therefore also the number and extent of the ranges of the discharge states of the electric energy storage unit for which these are respectively used to control the power train depends on the type of the vehicle and on many other vehicle parameters, and are defined for the respective vehicle or vehicle model.

In one preferred embodiment of the operating method, the blocking of the starting command is applied only in a predefinable speed range of the vehicle, or outside this predefinable speed range no blocking of the starting command is provided. The operating method preferably provides that the starting command is not blocked in a speed range which is lower than the maximum speed of the vehicle and which is greater than 10 km/h. This speed range is preferably greater than 20 km/h, preferably greater than 30 km/h and particularly preferably greater than 40 km/h. The lower limit of the speed range in which the starting command is not blocked preferably depends on the comfort factors of the respective vehicle and is freely predefinable. In particular, the operating method can be simplified by means of a speed range in which the starting command is not blocked, and if this lower limit of the speed range is selected in such a way that a changeover of operating mode from the zero-emission mode into the emission mode takes place in a way which is imperceptible or virtually imperceptible to vehicle occupants, this simplified operating method can be executed without comfort disadvantages.

A control unit in which the proposed operating method can be executed is preferably provided. The operating method is preferably stored as an executable computer program product on an internal storage medium of this control unit. The control unit preferably has a microcontroller for executing this operating method. This control unit is also preferably applied in a passenger car for controlling the power train thereof. In particular with a control unit with the proposed operating method in the form of a computer program product it is possible to control a power train of a hybrid vehicle, and therefore the hybrid vehicle, in a particularly comfortable way.

The invention, or individual features thereof, are explained in more detail below with reference to the partially schematic figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
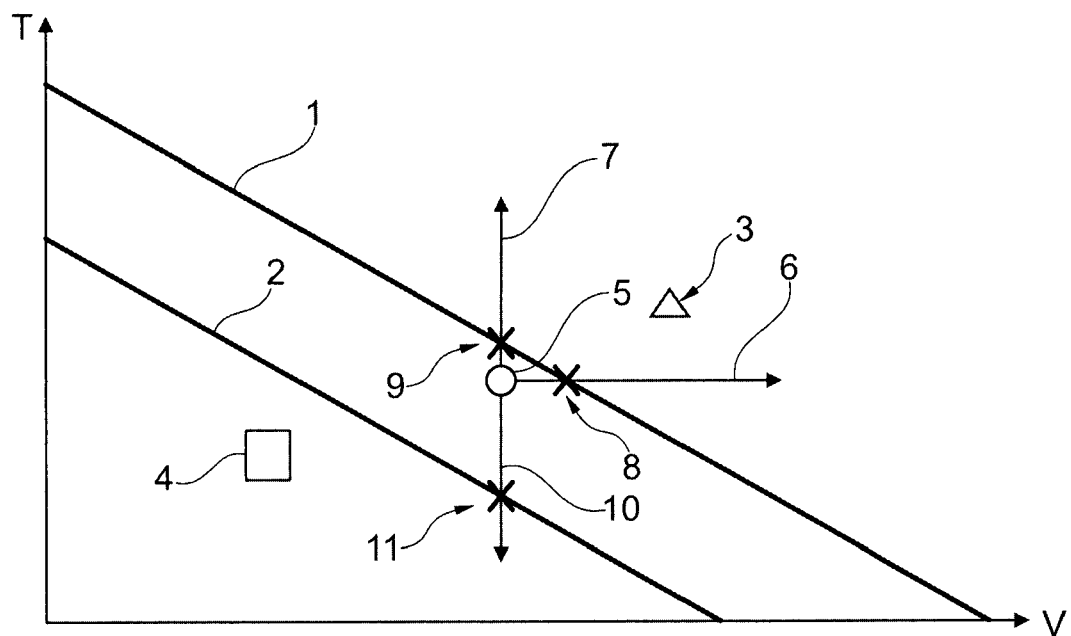
FIG. 1 shows a characteristic diagram having a plurality of electric travel characteristic curves.

FIG. 1 shows an exemplary characteristic diagram for controlling a power train for a hybrid vehicle by means of two electric travel characteristic curves 1, 2. Of these electric travel characteristic curves 1, 2, in each case only one is used to control the power train in a specific state of charge of the electric energy storage unit, more specifically if the latter is in a predetermined charge range, only one of these electric travel characteristic curves 1, 2 is therefore valid, or active, in each case.

The load request (T) to the power train is plotted here on the ordinate, and the vehicle speed (V) is plotted on the abscissa. With the currently valid electric driving curve 1 or 2, the hybrid power train is operated in the zero-emission mode, above which it is operated in the emission mode, and when the valid electric driving curve is exceeded from top to bottom, there is therefore a changeover from the zero-emission mode into the emission mode.

The operating points 3, 4, 5 represent different operating points of the power train, related to the vehicle speed (V) and the load request (T). Starting from the operating point 5, with a valid first electric travel characteristic curve 1, the following control profile is obtained with a known operating method:
- the operating point 5 is below the first electric travel characteristic curve 1, i.e. the hybrid vehicle is controlled in the zero-emission mode,
- the vehicle is accelerated with a constant acceleration, i.e. when there is an essentially constant load request (T) to the power train the speed (V) of the vehicle increases, and in FIG. 1 a displacement of the operating point 5 along the path 6 occurs, and
- if the vehicle speed (V) rises along the path 6 up to the intersection point 8, the internal combustion engine is started, and a changeover of operating mode (zero-emission mode→emission mode) takes place.

The same consideration can be produced for an increasing load request (T) with a constant vehicle speed (V):
- the operating point 5 is below the first electric travel characteristic curve 1 (zero-emission mode),
- the vehicle is moving at a constant vehicle speed (V) on a roadway with an increasing roadway gradient, i.e. the load request (T) increases, and in FIG. 1 a displacement of the operating point 5 along the path 7 occurs, and
- if the load request (T) rises along the path 7 up to the intersection point 9, the internal combustion engine is started and a changeover of operating mode (zero-emission mode→emission mode) takes place.

The two presented operating mode displacements along the paths 6, 7 can be understood in an exemplary fashion; in the real driving mode any desired displacements of the operating point on the flat are conceivable. The two changeovers of operating mode which are presented above can be expected by the driver and are therefore not felt to reduce comfort, or are felt to reduce comfort to a small degree.

Another effect on comfort of a changeover of operating mode (zero-emission mode→emission mode) can occur when there is switching over of the electric travel characteristic curve from 1 to 2, but this is also dependent on the operating point (3, 4, 5).

At the operating point 3, related to both electric travel characteristic curves 1, 2, the vehicle is already moving in the emission mode, i.e. switching over of the electric travel characteristic curve from 1 to 2 has no influence on comfort. At the operating point 4, the hybrid vehicle is moving forward, and after the switching over from the electric travel characteristic curve 1 to 2 in the zero-emission mode, thus there is also no influence on comfort from the switching over here either.

The proposed operating mode can be advantageously applied for operating points such as the operating point 5. Before the switching over of the first electric travel characteristic curve 1 to the second electric travel characteristic curve 2, the operating point 5 is below the first electric travel characteristic curve 1, and the power train is operated in the zero-emission mode. After the switching over, the operating point 5 is above the second electric travel characteristic curve 2 which is then valid.

At the moment at which the operating point is above the valid electric travel characteristic curve, the operating method determines a system-initiated starting command. This starting command is then blocked according to the proposed operating method, that is to say is not executed for a predefinable delay time of, for example, 5 seconds. If, for example, the load request T drops along the path 10 during this delay time, as is the case when the hybrid vehicle firstly overcomes a gradient at a constant speed and travel continues on the flat with the same speed V, starting from the intersection point 11 it is no longer necessary to additionally start the internal combustion engine. The starting command which is blocked up to the intersection point would not be executed by the proposed operating method, since the operating point of the power train is then again below the valid electric travel characteristic curve. As a result of the proposed operating method, the number of changeovers of operating mode from the zero-emission mode into the emission mode can therefore be reduced, and as a result comfort can be increased.

As presented, in hybrid vehicles the starting of the internal combustion engine, that is to say a changeover of the operating mode from a zero-emission mode into an emission mode, no longer takes place only in a stationary state (as in conventional vehicles) but also during travel. Either because the driver requests an increase in the power (increased load request to the power train) which is no longer being provided only by the electric motor in the driving situation (power-conditioned changeover of operating mode) or because a specific speed is exceeded (speed-conditioned changeover of operating mode). The electric motor can generally be operated only up to a specific vehicle speed.

In particular in the abovementioned cases (power/speed-conditioned changeover of operating mode) what is referred to as an electric driving curve is exceeded and an additional start of the internal combustion engine and therefore a changeover from the zero-emission mode into the emission mode is initiated immediately by the vehicle control unit in the case of a conventional driving method.

A further variant for the additional start of the internal combustion engine occurs when the high-voltage accumulator reaches a specific state of charge. During the driving in the zero-emission mode, the electric energy storage unit is discharged, and when a predefinable threshold value is reached a changeover is therefore carried out from charge depleting (electric energy storage unit is discharged) into charge sustaining (electric energy storage unit is charged or at least its electrical charge is maintained). In this context, in the driving mode of the hybrid vehicle, apart from recuperation, charge sustaining is possible only when the internal combustion engine is running.

When the threshold value presented above for the state of charge of the electric energy storage unit is reached, the power and speed limits from which a changeover of operating mode from the zero-emission mode into the emission mode takes place are changed, in other words, a changeover is performed from a first electric travel characteristic curve to a second electric travel characteristic curve.

The additional starting of the internal combustion engine takes place already in the case of a relatively low power request T to the power train and at a relatively low vehicle speed V with this second electric travel characteristic curve 2 in comparison with the first electric travel characteristic curve 1. Various possibilities for switching over from the first 1 to the second 2 electric travel characteristic curve are obtained from the described relationships:

1. The new operating point 4 is below the first 1 and below the second 2 electric travel characteristic curve. In this case, electric driving is carried out and no additional start of the internal combustion engine takes place even with the new electric travel characteristic curve (it remains in the zero-emission mode).

2. The operating point 3 is above the first 1 and therefore also above the second 2 electric travel characteristic curve. In this case, driving by means of the internal combustion engine (emission mode) already takes place before the changeover of the electric travel characteristic curve, and therefore also no additional starting of the internal combustion engine takes place at the changeover of the electric travel characteristic curve.

3. The operating point 5 is below the first 1 but above the second 2 electric travel characteristic curve. In this case, with the changeover of operating strategy or with the changeover of electric travel characteristic curve there is an additional start of the internal combustion engine (changeover from the zero-emission mode into the emission mode). If electric driving was being carried out before this changeover of the electric travel characteristic curve, the internal combustion engine is then operated in the fired operation. The changeover of operating mode (zero-emission mode→emission mode) is driven here by the changeover of electric travel characteristic curve.

In the case of the power-conditioned or speed-conditioned changeover of operating mode, the term driver-initiated changeover of operating mode is used, and in the case of a changeover of operating mode as a result of the switching over of the electric travel characteristic curve this can also be understood to be a changeover of operating strategy, and the term system-initiated changeover of operating mode can be used.

Even in the case of a changeover of electric travel characteristic curve which is driver-initiated or is requested by a system which is superordinate over a basic strategy (e.g. predictive energy management system), the proposed operating method can be applied and therefore a reduction in starting processes of the internal combustion engine can be achieved.

Further examples of a changeover of electric travel characteristic curve would be various other types of operating cases of charge sustaining.

As presented, a changeover of operating mode from the zero-emission mode into the emission mode can adversely affect the comfort of the hybrid vehicle for the vehicle occupants. It can be acoustically perceptible and/or give rise to vibrations/shaking. A significantly perceptible additional start of an internal combustion engine disrupts the electric mobility experience, which is based essentially on virtually noiseless locomotion. These effects occur in an even more amplified fashion in the case of an additional start of the internal combustion engine which is not initiated by the driver. For example, in the case of a kickdown acceleration (sudden increase in the load request to the power train) the driver would expect that the internal combustion engine is started, while the driver does not expect an additional start in the case in which the hybrid vehicle is moving on a flat roadway with a constant speed and he then experiences the changeover from the zero-emission load into the emission load as disruptive.

The proposed operating method leads, in particular, to a reduction in the changeovers of the operating mode, such as can occur in point 3, with a conventional operating method. With the proposed operating method, although it is the case, as in a conventional operating method, that a starting command for the internal combustion engine is determined, the number of changeovers of operating mode can be reduced, and driving comfort can be improved, by virtue of said starting command and thus the changeover of operating mode from zero-emission mode into the emission mode not being implemented immediately but rather being delayed (blocking of the changeover of operating mode) by a certain time window (delay time) or a certain charging capacity of the electric energy storage unit or a specific quantity of energy.

In the "gained" time, that is to say in the time for which the determined starting command is blocked or which passes until the specific charging capacity is extracted or the predefined travel distance has been traveled, the following can occur, as a result of which a conspicuous or destructive changeover of operating mode is avoided:

a. The driver changes over the state in point 3. into the state in point 1. Therefore, a driver-initiated, power-conditioned or speed-conditioned changeover of operating mode from the zero-emission mode into the emission mode takes place and this is perceived as less disruptive.

b. The driver changes over from the state in point 3. into the state in point 2. Therefore, the changeover of electric travel characteristic curve can be carried out without a changeover of operating mode. The driver will notice the changeover of operating mode as soon as the additional start takes place at the, for him customary, "sustaining" additional start operating points.

Only if the driver remains in the state in point 3. for longer than the chronological buffer or beyond this specific charging capacity or the predefined travel distance, will, as before, a system-initiative changeover of operating mode from the zero-emission mode into the emission mode take place.

In addition to the abovementioned handling of the electric travel characteristic curves 1, 2 for power-conditioned and speed-conditioned changeovers of operating mode, it is also possible to define operating ranges which are critical in terms of a changeover of operating mode and non-critical in terms of an operating mode, for the power train.

In such a case with predefined operating ranges, the requested changeover of operating mode can be implemented as soon as the vehicle is in an operating range which is non-critical in terms of changeover of operating mode. This approach makes sense, in particular, when a changeover of operating mode is already non-critical for the comfort starting, for example, from 40 km/h, but a speed-conditioned changeover of operating mode would only take place when 80 km/h were reached.

Figure 2:
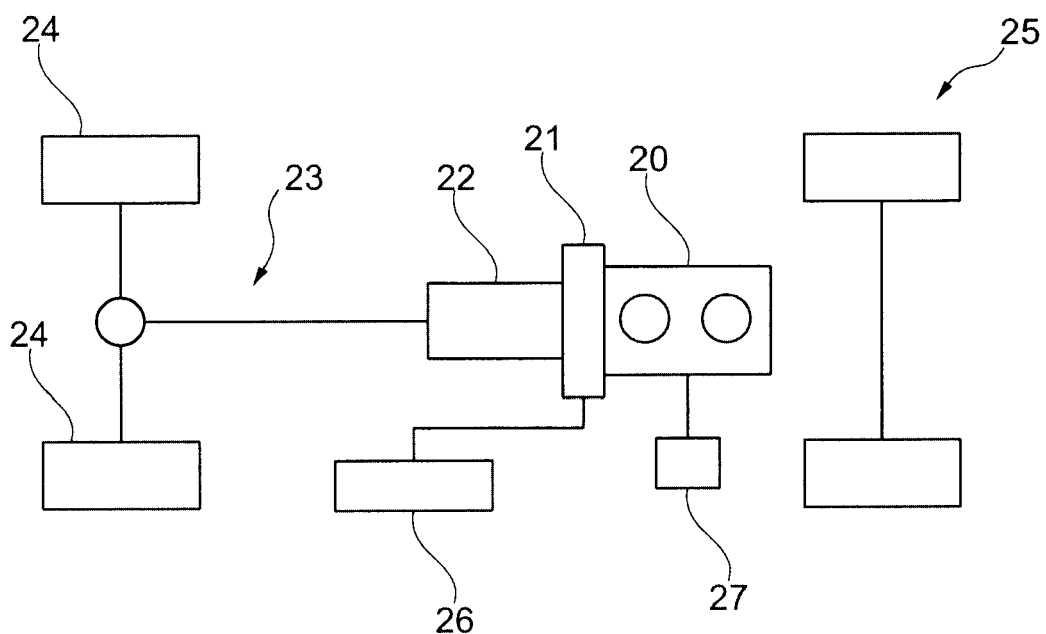
FIG. 2 shows a schematic hybrid power train which can be controlled with the operating method.

FIG. 2 illustrates a schematic power train for a hybrid vehicle. This power train has an internal combustion engine 20 and an electric motor 21. Drive power which is made available by these drive machines 20, 21 can be transmitted to the drive wheels 24 via a transmission 22 and the rest of the power train 23. The hybrid vehicle also has a non-driven axle 25. In this context, the operating method can be applied independently of the drive architecture (front-wheel drive, rear-wheel drive, all-wheel drive).

The electric motor 21 can be supplied with power from the electric energy storage unit 26. The proposed operating method is held as executable code in a data memory at the electronic control unit 27, and the power train is controlled by means of this control unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating method for a power train of a hybrid vehicle having an internal combustion engine, an electric drive machine and a rechargeable electric energy storage unit configured to supply the electric drive machine with energy, the method comprising the acts:

controlling the power train in a zero emission mode, in which the internal combustion engine is deactivated and in which the electric drive machine serves to drive the hybrid vehicle, and in an emission mode, in which the internal combustion engine is operated in a fired operation;

determining a starting command for a system initiated change of an operating mode from the zero emission mode into the emission mode, based on a transition between electric travel characteristic curves, each of which define an internal combustion engine starting threshold according to which the starting command is determined; and blocking the starting command for one of: a predefined delay time, a predefined quantity of energy extracted from the electric energy storage unit, or a predefined travel distance.

2. The operating method as claimed in claim 1, wherein each electric travel characteristic curve defines the internal combustion engine starting threshold for different values of one or more internal combustion engine starting parameters, and the transition between electric travel characteristic curves is based on the values of the one or more internal combustion engine starting parameters, and wherein the internal combustion engine starting parameters include: a state of charge of the electric energy storage unit, a roadway gradient which is being traveled along by the hybrid vehicle with this power train, and a temperature.

3. The operating method as claimed in claim 2, wherein each electric travel characteristic curve is a function of a plurality of control parameters, wherein the control parameters include: a vehicle speed, a load request to the power train.

4. The operating method as claimed in claim 3, wherein different values for the state of charge, the roadway gradient, and the temperature, are respectively defined for at least two discrete electric travel characteristic curves.

5. The operating method as claimed in claim 3, further comprising:

executing the starting command and thereby changing the operating mode from the zero emission mode to the emission mode, within a speed range and directly after determining the starting command, wherein the speed range is lower than a maximum achievable vehicle speed and higher than 10 km/h.

6. The operating method as claimed in claim 2, wherein different values for the state of charge, the roadway gradient, and the temperature, are respectively defined for at least two discrete electric travel characteristic curves.

7. The operating method as claimed in claim 6, further comprising:

executing the starting command and thereby changing the operating mode from the zero emission mode to the emission mode, within a speed range and directly after determining the starting command, wherein the speed range is lower than a maximum achievable vehicle speed and higher than 10 km/h.

8. The operating method as claimed in claim 2, further comprising:

executing the starting command and thereby changing the operating mode from the zero emission mode to the emission mode, within a speed range and directly after determining the starting command, wherein the speed range is lower than a maximum achievable vehicle speed and higher than 10 km/h.

9. The operating method as claimed in claim 1, further comprising:

executing the starting command and thereby changing the operating mode from the zero emission mode to the emission mode, within a speed range and directly after determining the starting command, wherein the speed range is lower than a maximum achievable vehicle speed and higher than 10 km/h.

10. A control unit for a hybrid vehicle having an internal combustion engine, an electric drive machine and a rechargeable electric energy storage unit configured to supply the electric drive machine with energy, the control unit having a computer program product which is stored in an internal data memory of the control unit, in the form of executable instructions which, when executed, cause the control unit to:

control the power train in a zero emission mode, in which the internal combustion engine is deactivated and in which the electric drive machine serves to drive the hybrid vehicle, and in an emission mode, in which the internal combustion engine is operated in a fired operation;

determine a starting command for a system initiated change of an operating mode from the zero emission mode into the emission mode, based on a transition between electric travel characteristic curves, each of which define an internal combustion engine starting threshold according to which the starting command is determined; and block the starting command for one of: a predefined delay time, a predefined quantity of energy extracted from the electric energy storage unit, or a predefined travel distance.

* * * * *